Aug. 26, 1958  F. W. TRUESDELL ET AL  2,849,551
CONTROL SWITCH
Filed Dec. 16, 1954  2 Sheets-Sheet 1
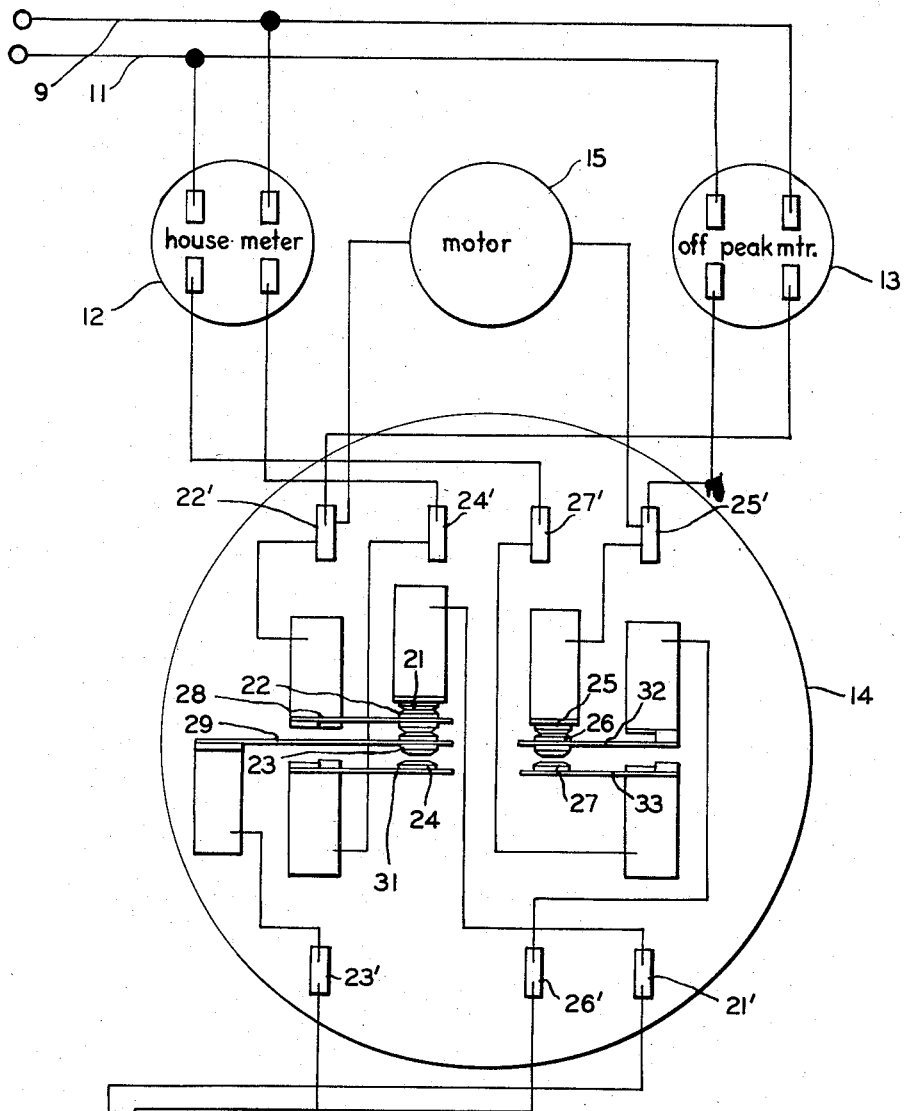
Fig.1
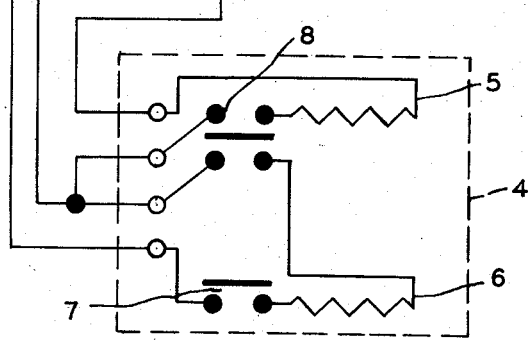
Inventors:
William J. Schultz
Francis W. Truesdell
by, Richard E. Horley
Their Attorney Inventors:
William J. Schultz
Francis W. Truesdell
by, Richard E. Hosley Their Attorney United States Patent Office 2,849,551
Patented Aug. 26, 1958

2,849,551

CONTROL SWITCH

Francis W. Truesdell, Dover, N. H., and William J. Schultz, Peabody, Mass., assignors to General Electric Company, a corporation of New York Application December 16, 1954, Serial No. 475,754

4 Claims. (Cl. 200—38)

This invention relates generally to control switches and, more particularly, to improvements in control switches useful in domestic electric water heater measuring and regulating systems.

Such systems are commonly referred to as off-peak control systems, and in one form thereof the system provides continuous hot water at all times but meters the power consumed by the water heater during the off-peak period at the off-peak rate. Most water heaters embody a pair of power consuming heating units, usually designated as the upper and lower units, and the upper unit is continuously connected to the power lines, whereas the lower unit is connected only during the off-peak periods.

Thus, control switches are necessary to provide metering at the regular and off-peak rates and to provide the necessary switching for the lower heater unit.

It has heretofore been the practice to utilize a watt-hour meter equipped with a double-rate register and provided with a built-in triple-pole, double-throw control switch to derive the necessary metering and regulation of the hot water heater. Such units proved to be large and bulky, overly complicated, and high in cost.

It is, therefore, one object of this invention to provide a more simplified and lower cost metering and switching arrangement than has heretofore been available for use.

It is another object to materially simplify the control switch used in the aforesaid arrangements whereby the necessary triple-pole double-throw action is accomplished with a switching mechanism utilizing only a slightly increased load over that normally encountered in a double-pole double-throw switch.

Briefly, in one aspect of the invention, the improved system contemplates the use of two standard watthour meters, one for normal house metering and one for off-peak metering, together with an improved control switch connected thereto and to the electric hot water heater. A novel arrangement of switch contacts and mounting means therefor provides the necessary switching in an expeditious and efficient manner.

The invention will be best understood upon reference to the detailed description set forth below when taken in conjunction with the drawings annexed hereto, in which:

Figure 1 is a schematic view of the metering and regulating system and associated electric hot water heater;

Figure 2:
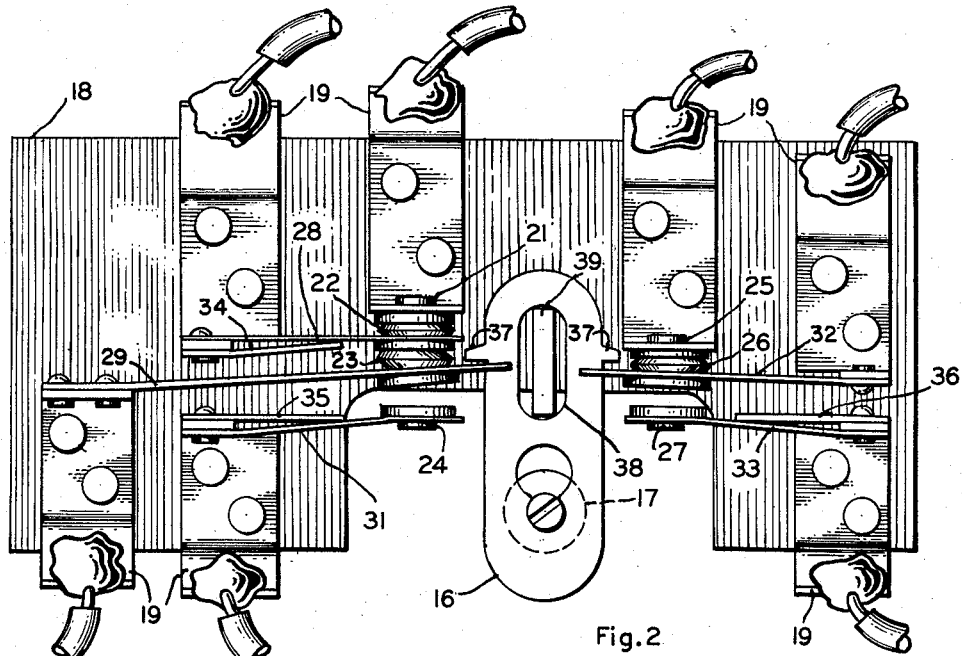
Figure 2 is an enlarged view of the contact arrangement of the control switch with the parts in position for off-peak metering.

Referring now to Figure 1, there is shown an electric hot water heater 4 having a pair of power consuming units in the form of upper and lower heating elements 5, 6 respectively. The heater also includes conventional single throw primary and double throw secondary thermostats 7, 8 connected as shown.

A pair of standard watthour meters are connected to the power lines 9, 11, one of the meters being the normal house meter 12 and the other being the off-peak meter 13. These meters are selectively connected to the water heater 4 by means of the control switch 14. Both the meters and the control switch are conventional plug-in units in that their terminals are in the form of contact blades that are intended to cooperate in a well known manner with suitable resilient blade receiving members mounted in respective sockets. In this way, substantially identical parts can be utilized for the meter and time switch housings and sockets, contributing to part uniformity and interchangeability with a consequent reduction in manufacturing costs.

The switch 14 includes a timing motor 15, and although the motor is shown separate from the switch in Figure 1, it is to be understood that this showing is only for the sake of clarity as the motor is normally included within the switch housing. The motor may be the well known Telechron synchronous motor, and further details thereof have been omitted in the interests of brevity.

The sequencing portion of the switch 14 may also be of a type well understood in the art, and details thereof have also been omitted in the interest of brevity. Suffice to say that the timing motor drives a conventional twenty-four hour circular dial plate around the periphery of which may be mounted suitable "on" and "off" switch trippers. These trippers are adjustably mounted on the dial to permit selection and adjustment of the timing cycle and cooperate with suitable mechanism to actuate a pivoted arm. This part of the switch is similar in principle to the time switch shown in U. S. Patent 2,020,974, Truesdell, issued November 12, 1935, the only difference being that the trippers replace the cam rise of the Truesdell patent and have a latch mechanism to hold the lever in the up position, the off tripper releasing this latch to let the pivoted arm come down. Other types of sequencing devices could be utilized so long as limited reciprocal motion is provided at regularly recurring spaced intervals of time.

Figure 3:
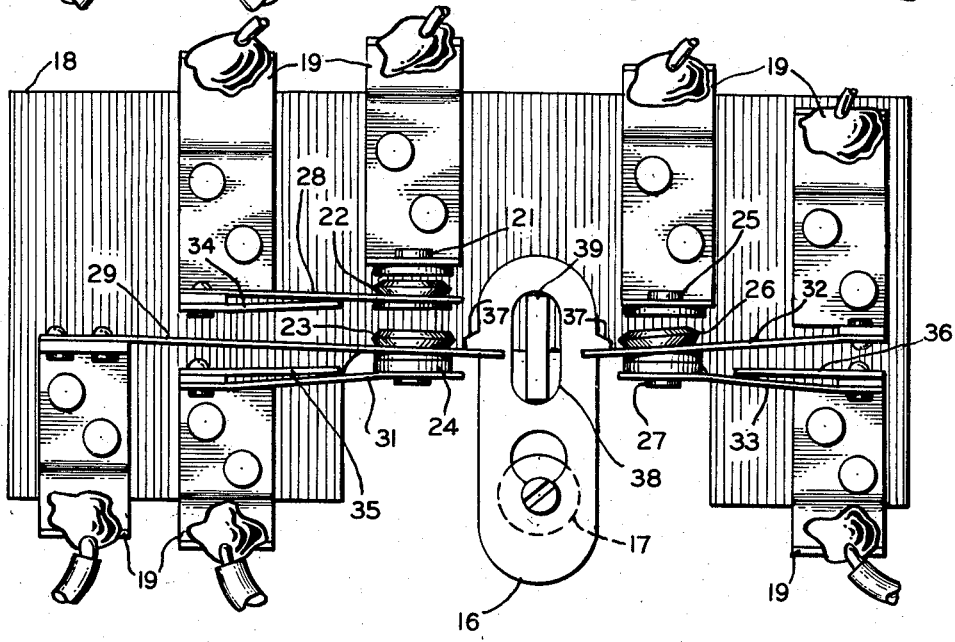
Figure 3 is an enlarged view of the contact arrangement of the control switch with the parts in position for normal house metering.

In Figures 2 and 3, the reciprocating actuator 16 moves up and down in response to the sequencing action, the post 17 being attached to a pivoted arm of the type shown in the aforesaid Truesdell patent. The post 17 extends through the cut-out portion of an insulating board 18 on which is mounted the novel contact arrangement.

Considering now the contact arrangement, it is noted that it comprises a series of fixed and movable contacts, all of which are supported with respect to the board 18 by a plurality of similar right-angle brackets 19. These brackets are all rigidly mounted on board 18 in any convenient manner, as by rivets or the like, and may have leads affixed to their outer ends by conventional soldering techniques.

Looking at Figure 2, it is seen that the contact arrangement provides first and second pairs of closed contacts and a third pair of open contacts to the left of actuator 16 and a fourth closed pair of contacts and a fifth open pair of contacts to the right of actuator 16.

Contacts 21, 22 comprise the first pair of contacts, contacts 22, 23 the second pair; contacts 23, 24 the third pair, contacts 25, 26 the fourth pair; and contacts 26, 27 the fifth pair. The contacts 22, 23, 24, 26, and 27 are first, second, third, fourth, and fifth movable contacts, with contacts 22, 23 and 26 being common contacts for two pairs of contacts. Contacts 21, 25 are rigidly mounted on the brackets 19 by rivets or the like, whereas contacts 22, 23, 24, 26, and 27 are rigidly mounted on the resilient spring blades 28, 29, 31, 32, 33, respectively, by rivets or the like, the blades in turn being mounted on brackets 19 by rivets or the like.

Blades 28, 31, and 33 are provided with stops 34, 35, 36 in the form of metallic tongues projecting outwardly from the bracket 19. These tongues can be deformed slightly when the switch is calibrated but otherwise remain fixed in position during normal operation of the switch 14 to act as stops.

The blade 28 is biased downwardly in a contact opening direction, and the blades 29, 31, 32, 33 are biased upwardly in a contact closing direction. Further, blades 29 and 32 are notched on their outer ends to cooperate with the actuator projections 37.

The biasing force on blade 28 may be approximately ⅓ ounce, and it may be 1⅓ ounces on blade 29, whereas it is a uniform 1 ounce on the remaining blades. This provides a contact force of 1 ounce when the actuator has moved to the off-peak position of Figure 1 and represents the force that the actuator must overcome to move the contacts to the house meter position.

The actuator 16 is provided with an opening 38 into which is inserted the insulating board 39 whereby the contacts on opposite sides of the actuator are shielded from one another. The board may frictionally engage the periphery of the opening so as to properly remain in place.

With the above arrangement of parts in mind, it is apparent that the contacts and blades on the right side of the actuator 16 comprise a substantially conventional single pole, double-throw switch assembly. However, on the left hand side of actuator 16, blade 28 with its contact 22 have been added and in combination with the other contacts provide therewith a pair of single-pole double-throw switches.

The contacts 21, 22, 23, 24, 25, 26, and 27 are connected, by suitable leads to the switch terminal blades 21', 22', 23', 24', 25', 26', and 27' respectively, and these blades are intended to cooperate with socket members having blade receiving portions connected to various elements of the regulating circuit.

Thus, the house meter 12 is connected across the terminals 24', 27', and the off-peak meter 13 and motor 15 are connected across the terminals 22', 25'. The upper element 5 of the heater is connected across terminals 23' and 26', and the lower element 6 is connected across terminals 21' and 26'.

Now, when the timing motor 15 and associated sequencing mechanism have operated to move the actuator 16 downwardly to the position shown in Figure 3, the contacts 22, 23 and 25, 26 are opened to disconnect the off-peak meter from the water heater. At the same time, contacts 23, 24 and 26, 27 close to connect the house meter to the upper element of the water heater. When the blade 29 is driven by the actuator away from blade 28, the biasing force of this latter blade also moves it downwardly to permit contacts 21, 22 to open and disconnect the lower heating element.

Reversal of the motion, that is, return of the actuator 16 to its upper position, as shown in Figure 2, opens contacts 23, 24 and 26, 27 to disconnect the house meter and closes contacts 21, 22, contacts 22, 23, and contacts 25, 26 to connect the off-peak meter across both the upper and the lower heater elements.

Thus, the upper element is continuously connected to the power lines and operates to furnish continuous hot water. During off-peak periods, the lower element is switched into the circuit to step up the heating at the off-peak rate.

The vertical arrangement of the contacts on opposite sides of the actuator, in combination with the biasing arrangement of the movable contacts, provides simple and effective switching to accomplish the necessary metering and regulating. The contact forces are held down to a minimum, and the load on the actuator is thus reduced to a minimum. Furthermore, the switch 14 allows the use of two standard watthour meters along with a switch having some of its parts interchangeable with some of the watthour meter parts, all of which contribute to low cost manufacture of the entire metering and regulating system.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What we claim as new and desire to secure by Letters Patent of the United States is:

1. A control switch comprising, in combination: a first pair of closed contacts, a second pair of closed contacts, said first and second pairs of contacts having a first common movable contact, a third pair of open contacts, said second and third pairs of contacts having a second common movable contact, said first and second common contacts being mounted on first and second resilient members normally biased towards one another, said second member having a biasing force of greater magnitude than the biasing force of said first member to normally close said first and second pairs of contacts, adjustable stop means for said first resilient members limiting motion thereof resulting solely from said biasing action, and means to move said second member relative to said first member to open said second pair of contacts and to close said third pair of contacts, said first member moving to open said first pair of contacts.

2. A control switch comprising, in combination: a first pair of closed contacts, a second pair of closed contacts, a first movable contact common to said first and second pairs of contacts, a third pair of open contacts, a second movable contact common to said second and third pairs of contacts, said third pair of contacts having as its other contact a third movable contact, said movable contacts being mounted on first, second, and third resilient members, respectively, said first and second members being biased toward each other, said second member having a biasing force of greater magnitude than the biasing force of said first member to produce a net biasing force in a first direction to normally close said first and second pairs of contacts, said third member also being biased in said first direction, adjustable stop means for said first and third resilient members limiting motion thereof resulting solely from said biasing action, and means to move said second member in a second direction opposite to said first direction to open said second pair of contacts and to close said third pair of contacts, said first pair of contacts opening automatically upon motion of said second member.

3. A control switch comprising, in combination: a first pair of closed contacts, a second pair of closed contacts, a first movable contact common to said first and second pairs of contacts, a third pair of open contacts, a second movable contact common to said second and third pairs of contacts, said third pair of contacts having as its other contact a third movable contact, all of said contacts in said three pairs of contacts being aligned along a common axis, said movable contacts being mounted on first, second and third spring blades, respectively, said first blade being biased in a contact opening direction and said second and third blades being biased in a contact closing direction, said second blade having a biasing force of greater magnitude than the biasing force of said first blade to normally close said first and second pairs of contacts, adjustable stop means for said first and third spring blades limiting motion thereof resulting solely from said biasing action, and a clock-driven member adapted to move said second blade in a contact opening direction, said first blade moving automatically to open said first pair of contacts, said second blade moving relative to said first blade to open said second pair of contacts and said third blade intercepting said second blade to close said third pair of contacts.

4. A control switch comprising, in combination: first and second pairs of closed contacts, said first and second pairs of contacts having a first common movable contact, a third pair of open contacts, said second and third pairs of contacts having a second common movable contact, said third pair of contacts having as its other contact a third movable contact, said first, second and third movable contacts being mounted on first, second and third resilient members, a fourth pair of closed contacts, a fifth pair of open contacts, said fourth and fifth pairs of contacts having a fourth common movable contact, said fifth pair of contacts having as its other contact a fifth movable contact, said fourth and fifth movable contacts being mounted on fourth and fifth resilient members, said first and second resilient members being normally biased toward each other and having a net biasing force in a first contact closing direction, said third, fourth and fifth resilient members also being biased in said first direction, adjustable stop means for said first, third, and fifth resilient members limiting motion thereof resulting solely from said biasing action, and means to move said second and fourth resilient members in a second direction opposite to said first direction to open said second and said fourth pairs of contacts and to close said third and said fifth pairs of contacts, said first pair of contacts opening automatically when said second member is moved in said second direction.

References Cited in the file of this patent

UNITED STATES PATENTS

| | | |
|---|---|---|
| 1,100,382 | Levison | June 16, 1914 |
| 1,873,238 | Wood | Aug. 23, 1932 |
| 2,007,703 | Bertschi | July 9, 1935 |
| 2,069,162 | Hailes | Jan. 26, 1937 |
| 2,237,705 | Kohl | Apr. 8, 1941 |
| 2,517,392 | Ettinger | Aug. 1, 1950 |
| 2,596,440 | Sampson | May 13, 1952 |
| 2,678,095 | Chapman | May 11, 1954 |
| 2,690,526 | Morrison | Sept. 28, 1954 |
| 2,748,204 | Woods et al. | May 29, 1956 |